E. W. ZEH.
POWER PRESS.
APPLICATION FILED MAY 29, 1912.

1,076,931.

Patented Oct. 28, 1913.

3 SHEETS—SHEET 1.

WITNESSES:
Cornelius Zabriskie
Frances E. Blodgett.

INVENTOR:
Edmund W. Zeh,
BY
Russell M. Everett,
ATTORNEY.

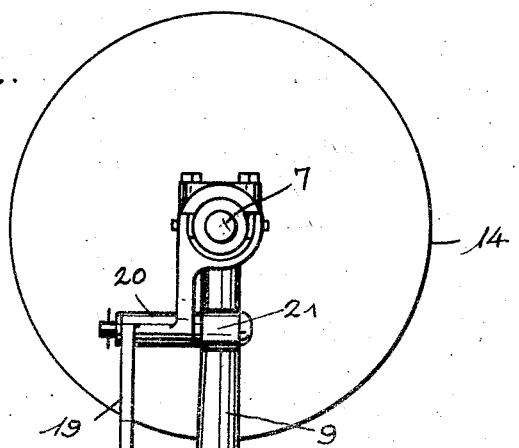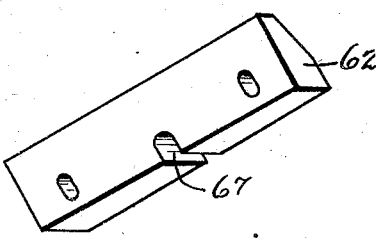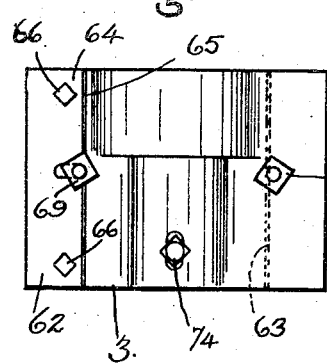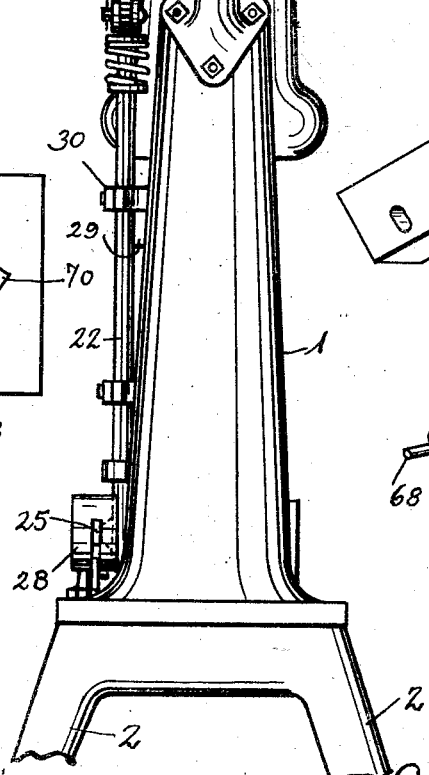

E. W. ZEH.
POWER PRESS.
APPLICATION FILED MAY 29, 1912.

1,076,931.

Patented Oct. 28, 1913.

3 SHEETS—SHEET 3.

WITNESSES

INVENTOR:
Edmund W. Zeh,
BY Russell M. Everett,
ATTORNEY.

UNITED STATES PATENT OFFICE.

EDMUND W. ZEH, OF NEWARK, NEW JERSEY.

POWER-PRESS.

1,076,931.  Specification of Letters Patent.  Patented Oct. 28, 1913.

Application filed May 29, 1912. Serial No. 700,427.

*To all whom it may concern:*

Be it known that I, EDMUND W. ZEH, a citizen of the United States, residing at Newark, in the county of Essex and State of New Jersey, have invented certain Improvements in Power-Presses, of which the following is a specification.

This invention relates to that class of power presses in which a head for carrying the upper die is moved up and down by a screw and means for oppositely rotating said screw.

The objects of the invention are to secure uniform pressure of the drive disks against the friction wheel of the screw and to provide a limit to such pressure; to secure a sliding head which shall serve simply as a guide, and to provide other means for transmitting the pressure to the die; to enable the wear between the said sliding head and its slideway to be taken up without displacing the center of said head laterally, or moving it out of axial alinement with the screw; to provide improved means for tightening the strap of the friction wheel which forms the peripheral surface thereof; to secure a friction wheel which will yield to absorb shocks and jars; to provide means for automatic operation of the press; to secure a frame especially adapted to resist the strain of operation of the press, and to obtain other advantages and results as may be brought out in the following description.

Figure 1:
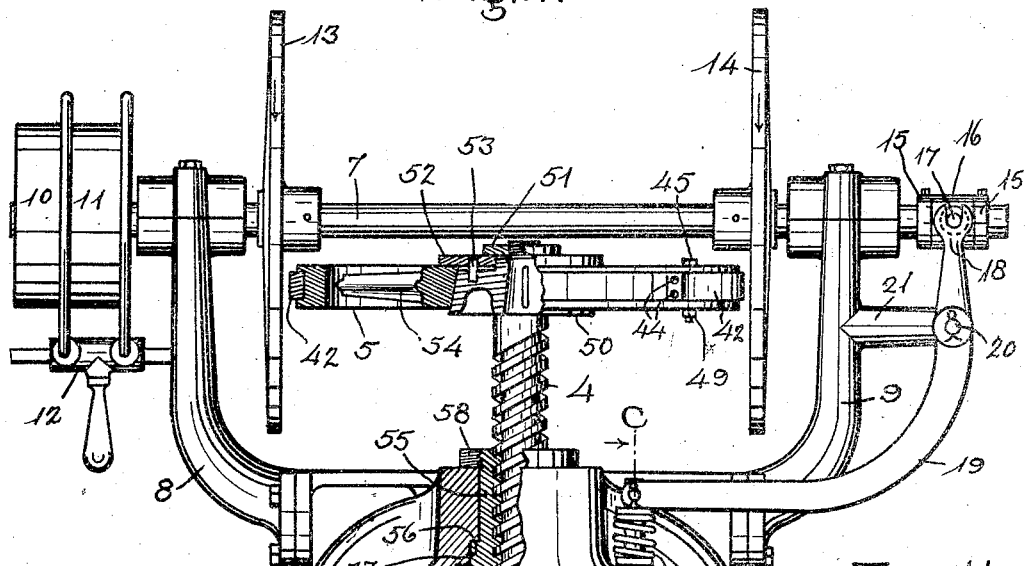
Figure 10:
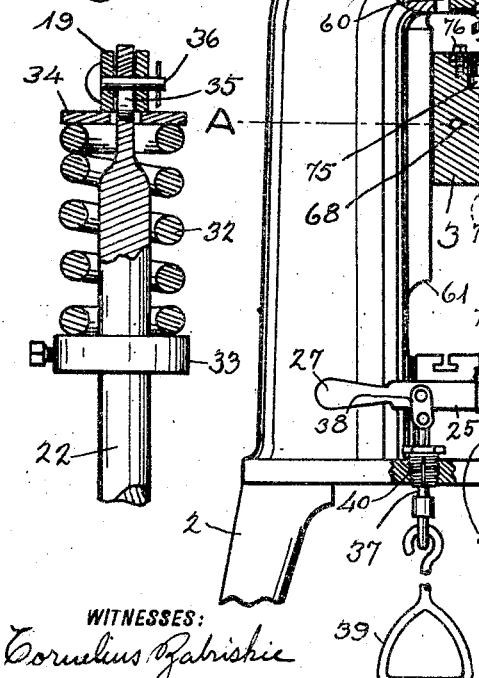
Figure 11:
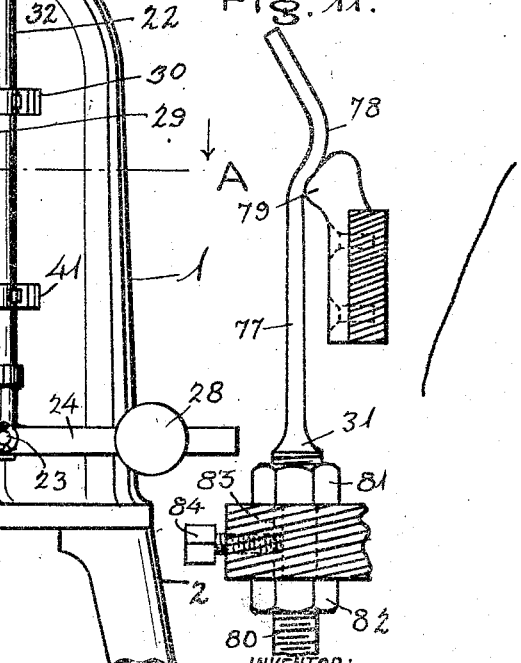
Figure 6:
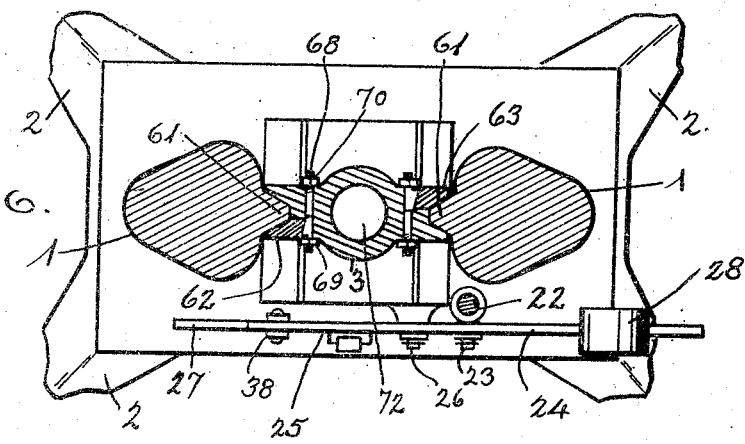
Figure 7:
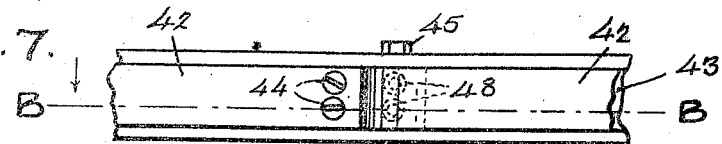
Figure 8:
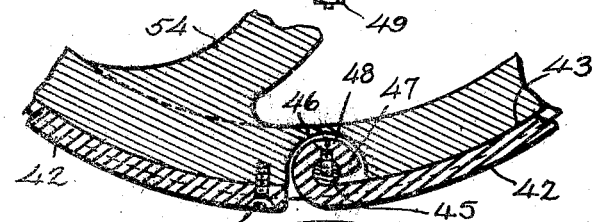
Figure 9:
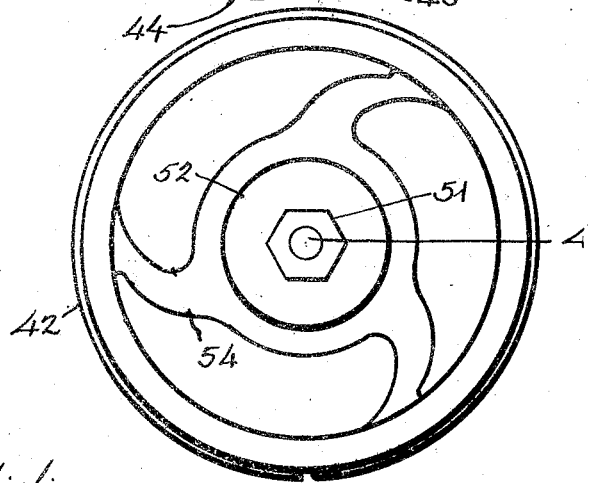

Referring to the accompanying drawings, in which like numerals of reference indicate the same parts throughout the several figures, Figure 1 is a front view of a power press of my improved construction, in idle condition, certain of the parts being in central vertical section; Fig. 2 is a view of the press from its right-hand side, as shown in Fig. 1; Fig. 3 is a view of the sliding head detached, as it looks from the front of the machine; Fig. 4 is a detail perspective view of one of the adjustable flanges of the sliding head; Fig. 5 is a similar perspective view of the wedge for moving said adjustable flange; Fig. 6 is a horizontal cross-section on line A—A, Fig. 1, looking downward; Fig. 7 is a detail edge view of the friction wheel, showing how the ends of the strap which forms the peripheral surface thereof are fastened; Fig. 8 is a section of the same on line B—B, Fig. 7; Fig. 9 is a plan of the friction wheel upon the screw but removed from the rest of the machine; Fig. 10 is a detail section on line C, Fig. 1, looking in the direction indicated by the arrow, and Fig. 11 is a similar section on line D, Fig. 1, but showing the lever depressed to cause the sliding head to descend.

In said drawings, 1 indicates the frame of my improved press, preferably mounted upon legs 2, 2 to elevate it to a suitable and convenient height. Said frame 1 is centrally open, providing a vertical slideway for a head 3 carried upon the lower end of a screw 4 which works through the top of the said frame 1 and has at its upper end above the frame a horizontal wheel 5 providing at its periphery a friction surface. The said slide 3 is adapted to carry at its lower end a die, not shown, and the frame 1 forms at the bottom of its central opening a bed 6 to receive the work or a lower die adapted to coöperate with the other die. In order to raise and lower the upper die, the screw 4 is alternately rotated in opposite directions by the following means: Above the friction wheel 5 a horizontal shaft 7 extends diametrically of said wheel, and is journaled in brackets 8, 9 bolted to and projecting upward from the frame 1 at opposite sides of the machine. This shaft is provided at one end outside the bracket 8 with fast and loose pulleys 10 and 11 adapted to receive a driving belt, not shown, and which belt can be moved from one pulley to the other by the belt shifter 12. Between its bearings in the brackets 8, 9, said shaft 7 has fast upon itself drive disks 13 and 14 adapted to alternately engage at their inner facing sides the opposite edges of the friction wheel 5. Obviously, as one or the other of said drive disks 13, 14 is engaged with the friction wheel 5, said friction wheel will be rotated in one direction or the other, and the screw 4 lowered or raised. To effect such alternate engagement of the drive disks 13, 14 with the friction wheel 5, the shaft 7 is slid longitudinally in its bearings in the brackets 8, 9 by the following means: Upon the end of the shaft 7 outside of the bracket 9 are two collars 15, 15 made fast to the shaft by set screws, and between said collars is a sleeve 16 rotatably loose upon the shaft and having trunnions 17 received by the forked end 18 of a lever 19 which is fulcrumed, as at 20, upon an arm 21 of the bracket 9 so as to swing in a plane through the shaft 7, and which plane I have shown substantially vertical. The lever 19 is at its lower end curved into substantially horizontal position and is connected pivotally to the upper end of a connecting rod 22. This connecting rod 22 has its lower end pivotally connected, as at 23, to the arm 24 of a horizontally disposed lever 25 which is pivoted upon the frame 1 or front of the bed 6 thereof, as at 26, to swing in a substantially vertical plane. The arm of this lever 25 opposite the arm 24 is provided with a handle 27 by means of which the lever can be swung to slide the drive disk shaft 7 and so rotate the screw 4 in either direction to move the head 3 up or down. Preferably a weight 28 upon the arm 24 of the lever 25 normally holds said arm 24 depressed, so as to engage the drive-disk 14 with the friction-wheel 5 and elevate the screw, and thus unless the handle 27 is positively forced downward and held there, the sliding head 3 will move upward. To terminate this upward movement, and keep the said head stationary in elevated position, a stop 29 is provided upon the sliding head 3 which as said head approaches its uppermost position engages an adjustable dog 30 fast on the connecting rod 22, which raises the weight 28 sufficiently to throw the drive disk 14 out of engagement with the friction wheel 5. If it should happen that the said drive disk 14 was thrown too far away from the friction-wheel 5 so that the other drive disk 13 was brought into engagement with the friction wheel 5, the head 3 would merely start downward again, when the weight 28 would immediately act to reverse its motion again and by this time the momentum would be lost enough so that the drive disks 13 and 14 would both remain out of operative engagement with the friction wheel 5, as shown in Fig. 1. In order to give the sliding head 3 a downward stroke, therefore, it is only necessary to force downward the handle 27, and simply release it to terminate the stroke. But in order to avoid having to hold down said lever 25 until the end of the stroke, I prefer to employ a detent 31, shown in Figs. 1 and 11. This detent has a resilient blade 77 projecting upward from the base of the frame 1, at one side of the lever 25, and provided with a swell 78 lying in the path of a nose 79 carried by the lever. The detent is shown mounted on the frame base by a threaded shank 80 extending therethrough with clamping nuts 81, 82 above and below, and having a longitudinal slot 83 to receive a set screw 84 through the edge of the frame base, to prevent turning of the shank and hold the blade 77 flatwise toward the lever, as will be understood. The lever can thus be forced down past the swell 78 of the detent and released, when it will stay depressed and the head 3 move downward. To terminate such downward movement, a second dog 41 is arranged upon the connecting rod 22 at the proper point to be engaged by the stop 29 and thus release the lever from the detent 31, so that the weight 28 will act to elevate the head as has been described. To cushion the motion given to the connecting rod 22 by impact of the stop 29 against the dog 30, and to insure uniform pressure of the drive disk 13 against the friction wheel 5, a spring 32 is arranged upon the upper end of the connecting rod 22 resting at its lower end upon a fixed collar 33 on said connecting rod and pressing at its upper end against a loose ring or washer 34, which engages the lever arm 19, see Fig. 10. The connection of the rod 22 with said arm 19 is then by means of a vertical slot in one of said members receiving a transverse pin in the other, as shown in Fig. 10, where 35 indicates a slot in the connecting rod 22 to receive the pin 36. Obviously the slot could be in the lever arm 19, so long as it were vertical, and the pin in the connecting rod 22, but it is more convenient to make the slot in the member where it is longitudinally disposed. By the means just described, the spring 32 will cushion the sudden movement of the connecting rod, compressing at first and then expanding to hold the drive disk against the friction wheel with a pressure which is thus always about the same. Similarly, the frictional engagement of the detent 31 with the lever 25 prevents any uncushioned impacts when the lever 25 is moved up or down past its swell 78, as in the automatic operation of the press hereinafter described.

In order to enable the lever 25 to be operated by the foot instead of by hand, if desired, a rod 37 extends through the base of the frame 1, and is connected at its upper end to the lever 25 by a link 38, the lower end of the rod 37 having a stirrup 39 for the foot. Furthermore, in order to enable the machine to operate automatically, the head 3 traveling up and down without attention from the operator, a split sleeve 40 is arranged upon the said rod 37 where the same passes through the base of the frame 1. This sleeve is normally loose upon the said rod 37, but is exteriorly threaded at its lower end and adapted to screw into a correspondingly threaded seat in the frame base, as shown in Fig. 1, so that it can be made to grip the said rod 37 frictionally. The upper end of the said sleeve 40 is adapted to receive a wrench, as shown, and when automatic operation of the machine is desired, said friction sleeve is clamped tight enough on the rod 37 to overcome the gravity of weight 28. Under these conditions, when the stop 29 on the head 3 engages the dog 30, which has been properly adjusted for automatic operation, the screw 4 will be reversed and the weight 28 held up so that the head 3 will make its downward stroke. At the end of said downward stroke the stop 29 engages in turn the second dog 41 upon the connecting rod 22, which slides said connecting rod downward and again reverses the screw. This action can be continued indefinitely. Obviously, any other means than the split sleeve 40 can be employed to produce sufficient friction to overcome the weight 28 and secure automatic operation of the press, and I do not wish to be understood as restricting myself to said sleeve.

The peripheral friction surface of the wheel 5 is preferably provided by fitting a strap 42 in a peripheral channel 43 of the wheel, one end of this strap being held by screws 44 extending into the rim of a wheel and the other end attached to a tightening bolt 45, as shown in detail in Figs. 7 and 8. A pocket 46 is formed in the rim of the wheel below the floor of the channel 43 and the bolt 45 extends through this pocket transversely of the rim. The end 47 of the strap is wound around the bolt 45 and secured thereto, as by screws 48, so that when the tightening bolt 45 is turned by its wrench-receiving head, the strap 42 is stretched tightly. Then by tightening the nut 49, the bolt 45 is locked against turning.

The friction wheel 5 is preferably made with a tapered hub 50 upon which the wheel-proper fits and to which said wheel-proper can be frictionally clamped. This clamping is accomplished by a nut 51 upon a threaded extension of the screw shaft, a washer 52 between said nut and the hub 50 overlapping upon the wheel-proper to force the same onto said hub, and said washer being held in non-rotatable relation to the hub by any suitable means, such as the pin 53, so that the nut 51 will not be turned. By the construction thus described, the frictional engagement between the hub 50 and the wheel-proper can be so adjusted as that said parts will slip with respect to each other under excessive strain and avoid breakage of the machine. To secure further resiliency and ease of action I have formed the friction wheel proper with spokes 54 which extend outward obliquely with respect to the radial lines and are of the proper size and weight to afford a little yielding when the wheel comes to an abrupt stop, or starts suddenly under a heavy strain.

The screw 4 works in a removable nut 55 arranged in the top of the frame 1, said nut being preferably inserted from beneath and having an annular shoulder 56 adapted to engage a corresponding shoulder 57 on the frame to resist upward strain when the screw is forced downward. A screw collar 58 at the projecting upper end of the nut holds it against downward movement, and to prevent rotation the nut has lateral lugs 59 which enter grooves 60 in the lower and largest part of the seat in the frame for said nut. The said annular shoulder 56 is shown disposed about half-way between the upper and lower ends of the nut, and thus only about one-half of the strain upon the nut tends to break the nut cross-sectionally at said shoulder. This strain can be further reduced by increasing the number of annular shoulders, and great strength and solidity are thus secured by this construction.

The lateral upright portions of the frame 1 are of an oval cross section, as shown in Fig. 6, with their thickest edges toward each other, and said edges are provided with beveled vertical ribs 61 which form slideways for the head 3. This construction of the frame secures especial strength and solidity as well as accuracy of movement of the sliding head. Said head has at its opposite sides grooves to receive the said ribs or slideways 61, and for enabling lost motion from wear or the like to be taken up, one side flange, 62 or 63, of each groove is made adjustable as will next be described in connection with the flange 62.

The adjustable flange 62 comprises not only the projecting portion at the side of the groove, but also a base portion 64, which fits into a recess 65 in the slide 3. The adjustable flange is then held to the slide 3 by screws or bolts 66 which extend through transverse slots in said portion 64 of the flange into the slide itself. For adjusting the slide, a transverse slot 67 is formed in the edge of its base midway of the ends, said slot decreasing in depth inwardly toward the slide 3. A bolt 68 threaded at both ends to receive nuts 69, 70 extends through the slide and slot 67 close to the wall of the recess 65 against which the base of the adjustable flange 62 abuts or to which wall said base is adjacent, and this bolt carries a wedge-shaped portion 71 adapted to lie in the tapered slot 67 of the adjustable flange. Thus if the slide is loose upon its ribs or slideways, the adjustable flange 62 is forced outward by loosening the nut 69 at one end of the bolt 68 and tightening the nut 70 at the other end, so as to draw the wedge 71 into the slot 67. This takes up the lost-motion, as will be understood upon reference to Fig. 6, more especially.

It will be understood that the two flanges 62, and 63 are adjusted equally and simultaneously, and since said flanges are on opposite sides of the sliding head 3 the axial central line of the sliding head will not be displaced, although the head may be slightly rotated. The bolts or screws 66 may be loosened during adjustment of the flange 62, and afterward tightened up again if desired. The head 3 serves simply as a guide and does not transmit a downward pressure of the screw 4. To effect such downward pressure, the lower end of the screw 4 abuts within the head 3 against the top of a die holder 72, as shown in Fig.

1. This die holder preferably projects below the head 3, and has a socket 73 to receive a die and a set screw 74 to clamp the die in said holder, said set screw being shown as extending through the side of the head 3, but loose therein so as to transmit no strain to said head. The upper end of the die holder preferably has an annular enlargement 75 to keep it from dropping out, and adjacent to the lower end of the screw which engages said upper end of the die holder, said screw has an annular recess adapted to receive a split-ring secured to the top of the sliding head 3 as by bolts 76, so as to attach said head to the screw to move upward therewith.

Having thus described the invention, what I claim is:

1. In a press, the combination of a frame, a screw mounted in said frame, a head on one end of said screw adapted to slide in said frame, a friction wheel on the other end of said screw, drive disks at opposite edges of said friction wheel, a slidable shaft for said drive disks, a pivoted lever adapted to slide said shaft, a controlling lever fulcrumed upon said frame, a connecting rod between said levers, and means always tending to return said controlling lever into position to engage the elevating drive disk with the friction wheel.

2. In a press, the combination of a frame providing a slideway, a screw mounted in said frame, a head arranged in said slideway on one end of said screw, a friction wheel on the other end of said screw, drive disks at opposite edges of said friction wheel, a slidable shaft for said drive disks, a pivoted lever adapted to slide said shaft, a controlling lever fulcrumed upon said frame at the base thereof, a connecting rod between said levers, and a weight on said controlling lever adapted to normally hold the elevating drive disk in engagement with the friction wheel.

3. In a press, the combination of a frame providing a slideway, a screw mounted in said frame, a head in said slideway on one end of said screw, a friction wheel on the other end of said screw, drive disks at opposite edges of said friction wheel, a slidable shaft for said drive disks, a pivoted lever adapted to slide said shaft, a controlling lever fulcrumed upon said frame at the base thereof, a slidable connecting rod between said levers adjacent said sliding head, a weight on said controlling lever adapted to normally hold the elevating drive disk in engagement with the friction wheel, a dog on said connecting rod, and a stop on the sliding head adapted to engage said dog at the upper end of the stroke of said head.

4. In a press, the combination of a frame providing a slideway, a screw mounted in said frame, a head arranged in said slideway on one end of said screw, a friction wheel on the other end of said screw, drive disks at opposite edges of said friction wheel, a slidable shaft for said drive disks, a pivoted lever adapted to slide said shaft, a controlling lever fulcrumed upon said frame at the base thereof, a slidable connecting rod between said levers adjacent the sliding head, means for normally holding said controlling lever in position to engage the elevating drive disk with the friction wheel, means for automatically disengaging said elevating drive disk to terminate the upstroke, means for releasably holding the controlling lever in position to engage the lowering drive disk with the friction wheel, a dog on said connecting rod, and a stop on the sliding head adapted to engage said dog at the lower end of the stroke of said head.

5. In a press, the combination with a frame providing a slideway, a screw mounted in said frame, a head arranged in said slideway on one end of said screw, a friction wheel on the other end of said screw, drive disks at opposite edges of said friction wheel, a slidable shaft for said drive disks, a pivoted lever adapted to slide said shaft, a controlling lever fulcrumed upon said frame, a slidable connecting rod between said levers adjacent the sliding head, means for normally holding said controlling lever in position to engage the elevating drive disk with the friction wheel, an upper dog on the connecting rod, means for releasably holding the controlling lever in position to engage the lowering drive disk with the friction wheel, a lower dog on the connecting rod, and a stop on the sliding head adapted to engage said dogs at the upper and lower ends of the stroke, respectively.

6. In a press, the combination of a frame providing a slideway, a screw mounted in said frame, a head arranged in said slideway on one end of said screw, a friction wheel on the other end of said screw, drive disks at opposite edges of said friction wheel, a slidable shaft for said drive disk, a pivoted lever adapted to slide said shaft, a controlling lever fulcrumed upon said frame at the base thereof, a slidable connecting rod between said levers adjacent the sliding head and having a slot-and-pin connection with the slide lever, a spring normally holding the pin of said connection at the end of its slot away from the controlling lever, means always tending to hold the controlling lever in position to engage the elevating drive disk with the friction wheel, a dog on said connecting rod, and a stop on the sliding head adapted to engage said dog at the upper end of the stroke of said head.

7. In a press, the combination of a frame providing a slideway, a screw mounted in said frame, a head arranged in said slideway on one end of said screw, a friction wheel on the other end of said screw, drive disks at opposite edges of said friction wheel, a slidable shaft for said drive disks, a pivoted lever adapted to slide said shaft, a controlling lever fulcrumed upon said frame at the base thereof, a slidable connecting rod between said levers and adjacent the sliding head, means for normally holding the controlling lever in position to engage the elevating drive disk with the friction wheel, a detent adapted to releasably hold the controlling lever with the lowering drive disk in engagement with the friction wheel, an upper dog on the connecting rod, and a stop on the sliding head adapted to engage said dog at the upper end of the stroke of the head.

8. In a press, the combination of a frame providing a slideway, a screw mounted in said frame, a head arranged in said slideway on one end of the screw, a friction wheel on the other end of said screw, drive disks at opposite edges of said friction wheel, a slidable shaft for said drive disks, a pivoted lever adapted to slide said shaft, a controlling lever fulcrumed upon said frame at the base thereof, a slidable connecting rod between said levers and adjacent the sliding head, means for normally holding the controlling lever in position to engage the elevating drive disk with the friction wheel, a spring detent arranged at one side of said controlling lever and having next said lever a swell adapted to frictionally resist passing of the lever, an upper dog on the connecting rod, and a stop on the sliding head adapted to engage said dog at the upper end of the stroke of the head.

9. In a press, the combination of a frame providing a slideway, a screw mounted in said frame, a head arranged in said slideway on one end of said screw, a friction wheel on the other end of said screw, drive disks at opposite edges of said friction wheel, a slidable shaft for said drive disks, a pivoted lever adapted to slide said shaft, a controlling lever fulcrumed upon said frame at the base thereof, a slidable connecting rod between said levers adjacent the sliding head, a weight adapted to normally hold said controlling lever in position to engage the elevating drive disk with the friction wheel, an upper dog on the connecting rod, a spring detent for releasably holding the controlling lever in position to engage the lowering drive disk with the friction wheel, a lower stop on the connecting rod, and a stop on the sliding head adapted to engage said dogs at the upper and lower ends of the stroke, respectively.

10. In a press, the combination of a frame providing a slideway, a screw mounted in said frame, a head arranged in said slideway on one end of said screw, a friction wheel on the other end of said screw, drive disks at opposite edges of said friction wheel, a slidable shaft for said drive disks, a pivoted lever adapted to slide said shaft a controlling lever fulcrumed upon said frame at the base thereof to swing in a substantially vertical plane, a connecting rod between said levers adjacent the sliding head, a weight on one end of said controlling lever, the other end of the lever providing a handle, and a stirrup pivoted to said handled end of the controlling lever.

11. In a press, the combination of a frame providing a slideway, a screw mounted in said frame, a head arranged in said slideway, on one end of said screw, a friction wheel on the other end of said screw, drive disks at opposite edges of said friction wheel, a slidable shaft for said drive disks, a pivoted lever adapted to slide said shaft, a controlling lever fulcrumed upon said frame at the base thereof, a connecting rod between said levers adjacent the sliding head, a rod pivoted to said controlling lever, an adjustable friction sleeve for said rod, a dog on the said connecting rod, and a stop on the sliding head adapted to engage said dog.

12. In a press of the character described, the combination with a screw having a hub tapering away from its threaded portion, said hub having a pin projecting from its end away from said screw, of a friction wheel adapted to be seated on said hub in frictional engagement therewith, a washer on the hub overlapping said wheel and being apertured to receive said pin, and means for clamping said washer against the friction wheel.

13. In a press, the combination of a frame providing a slideway, a head mounted in said slideway and having a central aperture, a die holder in said central aperture of the head, a screw mounted in the frame and engaging the upper end of said die holder, and means for turning said screw, whereby the pressure of said screw is transmitted directly to the die holder and said die holder is guided by the sliding head.

14. In a press, the combination of a frame providing a slideway, a head mounted in said slideway and having a longitudinal central aperture enlarged at one end, a die holder in said central aperture of the head having at one end an enlargement in said enlargement of the aperture and at its other end being adapted to receive a die, a screw mounted in the frame and abutting said enlarged end of the die holder, means connecting said sliding head to said screw to cause them to move along the slideway together, and means at the other end of the screw for turning the same.

15. In a press, the combination of a frame providing a slideway with opposite beveled ribs, a head in said slideway grooved at its opposite edges to receive said ribs, one flange of each groove at opposite sides of the head being adjustable in edgewise direction away from the head toward the frame, and means for adjusting said flanges, whereby lost-motion of the sliding head in its slideway can be taken up without displacing the axial central line of said head.

16. In a press, the combination of a frame providing a slideway with opposite beveled ribs, a head in said slideway having at its opposite edges grooves to receive said ribs and flanges to lie at opposite sides thereof, one flange at each edge of said head and on opposite sides thereof being adjustable in edgewise direction away from the head toward the frame, bolts having wedge-shaped portions at the middles of said adjustable flanges for adjusting them, and means for clamping said adjustable flanges in position when adjusted.

17. In a press, the combination of a frame providing a slideway with opposite beveled ribs, a head in said slideway having at its opposite edges grooves to receive said ribs and flanges to lie at opposite sides thereof, one flange at each edge of said head and on opposite sides thereof being separable from the head and having in its edge next said head a slot with a tapered wall next the outer edge of the flange, said slot being midway of the length of the flange and said flange having near its ends transverse slots, a bolt extending through the head and middle slot in each adjustable flange, said bolt having a wedge-shaped portion adapted to engage said tapered wall, clamping bolts in the end slots of each adjustable flange, and nuts on the opposite ends of said adjusting bolts.

18. In a press, the combination of a frame providing an opening with slideways at the opposite sides thereof and a bed at one end, a screw mounted in said frame at the other end of said opening, the said frame at each side of said opening being of oval cross-section with the thickest edge toward said opening and provided with ribs forming the said slideways, a head adapted to slide on said slideways, means connecting said head to said screw, and means for turning said screw.

EDMUND W. ZEH.

Witnesses:
HOWARD P. KING,
FRANCES E. BLODGETT.